US009654511B1

(12) United States Patent
Brocco et al.

(10) Patent No.: US 9,654,511 B1
(45) Date of Patent: *May 16, 2017

(54) CLOUD DATA PROTECTION

(71) Applicant: Symantec Corporation, Mountain View, CA (US)

(72) Inventors: Matthew Brocco, Debary, FL (US); Steven R. DeVos, Mercer Island, WA (US)

(73) Assignee: Veritas Technologies LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/824,729

(22) Filed: Aug. 12, 2015

Related U.S. Application Data

(63) Continuation of application No. 13/189,441, filed on Jul. 22, 2011, now Pat. No. 9,118,685.

(51) Int. Cl.
*H04L 29/06* (2006.01)
*G06F 11/14* (2006.01)

(52) U.S. Cl.
CPC ......... *H04L 63/20* (2013.01); *G06F 11/1402* (2013.01)

(58) Field of Classification Search
CPC ..... H04L 63/102; H04L 63/20; G06F 11/1402
USPC .......................................................... 726/1
See application file for complete search history.

(56) References Cited

U.S. PATENT DOCUMENTS

| | | | |
|---|---|---|---|
| 8,347,388 B1 | 1/2013 | Dutch et al. | |
| 9,118,685 B1 * | 8/2015 | Brocco | H04L 63/102 |
| 2011/0106882 A1 | 5/2011 | Takakura et al. | |
| 2012/0072985 A1 * | 3/2012 | Davne | H04L 63/0272 |
| | | | 726/22 |
| 2012/0167197 A1 | 6/2012 | Kruger et al. | |
| 2012/0303736 A1 | 11/2012 | Novotny et al. | |

OTHER PUBLICATIONS

Schonfeld, E., "First Round, Betaworks, and Angels Back Up Backupify with $900K," TechCrunch, Feb. 16, 2010, 11 pages, [Online] [Retrieved on Jul. 17, 2012], Retrieved from the internet<URL:http://techcrunch.com/2010/02/16/backupify-900k/>.

(Continued)

*Primary Examiner* — Jeffrey D Popham
(74) *Attorney, Agent, or Firm* — Fenwick & West LLP

(57) ABSTRACT

A cloud data protection system protects cloud data of an enterprise. A protection policy for the enterprise is established by an administrator of the enterprise. The protection policy describes one or more types of cloud data protection to provide to the enterprise's cloud data. The cloud data protection system examines the protection policy to identify cloud data associated with the enterprise to access in order to implement the policy, and uses a personality object to retrieve the identified cloud data from one or more cloud services. The cloud data protection system performs one or more protection actions on the retrieved cloud data. The protection actions can include scanning the cloud data for malicious software, for compliance with a data loss prevention policy, or for data matching a discovery specification. The protection actions can also include archiving or backing up the cloud data.

21 Claims, 6 Drawing Sheets

(56) References Cited

OTHER PUBLICATIONS

"Free Tools to Back Up Your Online Accounts," Lifehacker.com, 7 pages, Aug. 17, 2009, [Online] [Retrieved on Oct. 18, 2011] Retrieved from the Internet<URL:http://lifehacker.com/5335553/free-tools-to-back-up-your--online-accounts>.

"How It Works," Backupify, 2011, 4 pages, [Online] [Retrieved on Oct. 18, 2011] Retrieved from the Internet<URL:https://www.backupify.com/tour>.

"Pricing for Social Media & Web Apps," Backupify, 2011, 4 pages, [Online] [Retrieved on Oct. 18, 2011] Retrieved from the Internet<URL:https://www.backupify.com/socialmediabackup>.

"What is Backupify," Backupify, 2011, 3 pages, [Online] [Retrieved on Oct. 18, 2011] Retrieved from the Internet<URL:https://www.backupify.com/about>.

United States Office Action, U.S. Appl. No. 13/189,441, Oct. 20, 2014, 19 pages.

United States Office Action, U.S. Appl. No. 13/189,441, Apr. 16, 2014, 19 pages.

United States Office Action, U.S. Appl. No. 13/189,441, Sep. 26, 2013, 15 pages.

\* cited by examiner

CLOUD DATA PROTECTION

CROSS-REFERENCE TO RELATED APPLICATIONS

This application is a continuation of U.S. patent application Ser. No. 13/189,441 filed on Jul. 22, 2011, which is incorporated by reference in its entirety.

BACKGROUND

1. Field of Art

The present invention generally relates to the field of cloud computing and in particular to protecting data maintained in cloud computing environments.

2. Background of the Invention

Modern enterprises typically maintain large amounts of mission-critical data. Formerly, the enterprises tended to store such data locally, on their own premises. An advantage of storing the data locally was that enterprises could maintain control of the data. This control allowed the enterprises to perform data protection tasks such as backing up and archiving the data using applications hosted at the enterprises.

Now, it is common for enterprises to use cloud services to store the data remotely. Users at the enterprise access the cloud-based data via the Internet or another network. While storing data in the cloud provides many advantages, using cloud storage also means enterprises must relinquish some control over their data. For example, while a cloud service typically backs up an enterprise's cloud data, the service might not let the enterprise specify the frequency of the backups or the types of data that are backed up. Similarly, the enterprise might not be able to perform certain types of operations on the data, such as detecting malicious software, that could be performed if the data were hosted on premises. Thus, the enterprises must make certain sacrifices in order to obtain the benefits of cloud services.

As a result, enterprises that store data in the cloud are exposed to certain risks, such as data loss, that they are not necessarily exposed to if they host the data locally. This problem is especially acute for certain enterprises, such as healthcare-related enterprises, that must store sensitive data in accordance with strict regulatory requirements.

SUMMARY

The above and other issues are addressed by a computer-implemented method, non-transitory computer-readable storage medium, and computer for protecting cloud data of an enterprise. Embodiments of the method comprise receiving a protection policy for the enterprise. The protection policy describes one or more types of cloud data protection to provide to cloud data of the enterprise. The method additionally comprises accessing cloud data stored by one or more remote cloud services to retrieve cloud data associated with the enterprise and performing one or more protection actions on the retrieved cloud data responsive to the protection policy.

Embodiments of the non-transitory computer-readable storage medium store executable computer program instructions performing steps comprising receiving a protection policy for the enterprise. The protection policy describes one or more types of cloud data protection to provide to cloud data of the enterprise. The steps further comprise accessing cloud data stored by one or more remote cloud services to retrieve cloud data associated with the enterprise and performing one or more protection actions on the retrieved cloud data responsive to the protection policy.

Embodiments of the computer comprise a non-transitory computer-readable storage medium storing executable computer program instructions. The instructions perform steps comprising receiving a protection policy for the enterprise. The protection policy describes one or more types of cloud data protection to provide to cloud data of the enterprise. The instructions further access cloud data stored by one or more remote cloud services to retrieve cloud data associated with the enterprise and perform one or more protection actions on the retrieved cloud data responsive to the protection policy. The computer additionally comprises a processor for executing the computer program instructions.

DETAILED DESCRIPTION

Figure 1:
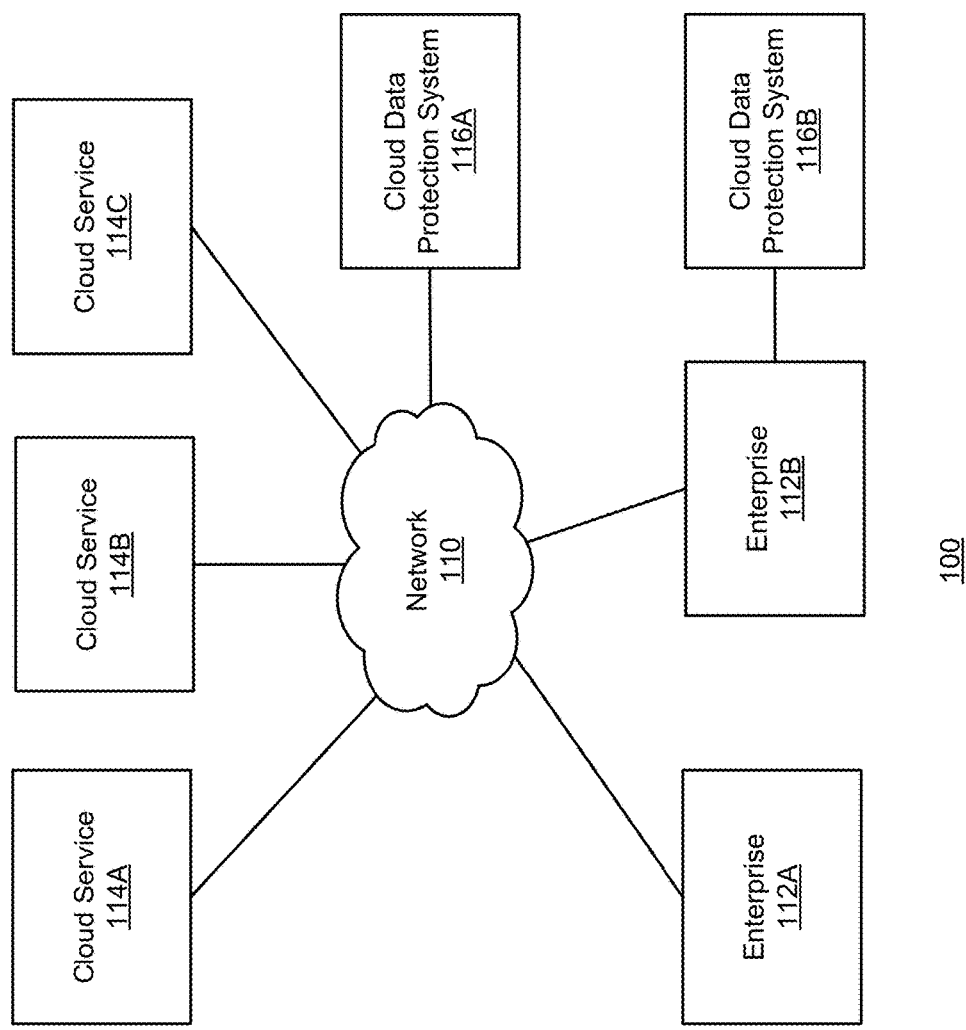
FIG. 1 is a high-level block diagram illustrating an environment for protecting cloud data according to several embodiments.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A" and/or "112B" in the figures).

FIG. 1 is a high-level block diagram illustrating an environment 100 for protecting cloud data according to several embodiments. FIG. 1 illustrates a network 110, such as the Internet, connecting multiple enterprises 112A, 112B to multiple remote cloud services 114A, 114B, 114C, and to a remote cloud data protection system 116A (the "protection system"). In addition, a second protection system 116B is directly connected to one of the enterprises 112B. While FIG. 1 shows only two enterprises 112A, 112B and three cloud services 114A, 114B, 114C for simplicity, embodiments of the environment 100 can have many of these entities. There can also be more than the two illustrated protection systems 116A, 116B. Other entities may be connected to the network 110 as well.

An enterprise 112 is an organization such as a business, school, or government agency. The enterprise 112 generates and consumes data during its operation, such as customer-related data (e.g., mailing lists, data provided by customers) and internal data (e.g., email among members of the enterprise, employee-related information). The enterprise 112 stores at least some of the data using one or more cloud services 114. The data stored using the cloud services 114 are called "cloud data" herein. In addition, the enterprise 112 may consume resources provided by the cloud services 114 in connection with the cloud data. For example, the enterprise may use resources provided by a cloud service 114 that operates according to the Software-as-a-Service (SaaS) model. In the SaaS model, software and data are hosted by the cloud service 114, and members of the enterprise access the software and data using client computers, such as a desktop, notebook, or tablet computers executing web browsers.

Members of the enterprise access the cloud data by providing authentication credentials to the cloud services 114. The authentication credentials may include, for example, a login identifier/password pair. Some members of the enterprise are administrators. The administrators are responsible for protecting the enterprise's cloud data.

The cloud services 114 are provided by cloud service providers and are remote from the enterprises 112 and the protection systems 116. In general, the cloud services 114 store cloud data on behalf of the enterprises 112 and provide applications that act on the data. The specific types of cloud services 114 in the environment 100 depend upon the specific embodiment. Examples of cloud services include customer relationship management (CRM) services from SALESFORCE.COM, INC., email services provided by GOOGLE INC., and storage services provided by AMAZON.COM, INC. Depending upon the services 114 and how they are used, the services can receive and store cloud data provided by the enterprises 112 and protection systems 116, and also provide cloud data to the enterprises and protection systems. The individual components of the cloud data stored by the cloud services 114 are referred to herein as "data objects."

The protection system 116 protects the cloud data that the cloud services 114 store on behalf of the enterprises 112. In one embodiment, the protection system 116A is remote from the enterprises 112 and the cloud services 114 and protects cloud data for multiple enterprises. In another embodiment, the protection system 116B is located on the premises of a particular enterprise 112B, and protects cloud data for only that enterprise. Regardless of its location, the protection system 116 can protect cloud data that the enterprises store using multiple, different, cloud services 114.

In one embodiment, the protection system 116 receives authentication credentials from an enterprise 112 for the cloud services 114 holding the data that the enterprise desires to protect. The protection system 116 uses the credentials to retrieve the cloud data from the cloud services 114. The protection system 116 then protects the retrieved cloud data according to a protection policy established by the enterprise 112. The types of protection can vary in different embodiments and for different enterprises, depending upon the service agreements between the enterprises and the operator of the protection system 116. The types of protection may include backing up the cloud data, archiving the data, and performing data loss prevention (DLP) on the data. The protection system 116 can also use the authentication credentials to provide protected data to the cloud services 114. For example, the protection system 116 can restore backed-up data to the cloud services 114.

Thus, the protection system 116 allows the enterprises 112 to protect their cloud data. By specifying appropriate protection policies, the enterprises 112 can protect the data using techniques and/or granularities that are not provided by the cloud services 114. As a result, enterprises 112 can enjoy the benefits that cloud services 114 provide, without being subject to some of the drawbacks related to loss of control of the cloud data.

The network 110 represents communication pathways between entities connected to the network and in one embodiment is the Internet. In one embodiment, the network 110 uses standard communications technologies and/or protocols. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), HTTP Secure (HTTPS), virtual private networks (VPNs), Internet Protocol security (IPsec), etc. In another embodiment, the entities on the network 110 use custom and/or dedicated data communications technologies instead of, or in addition to, the ones described above.

Figure 2:
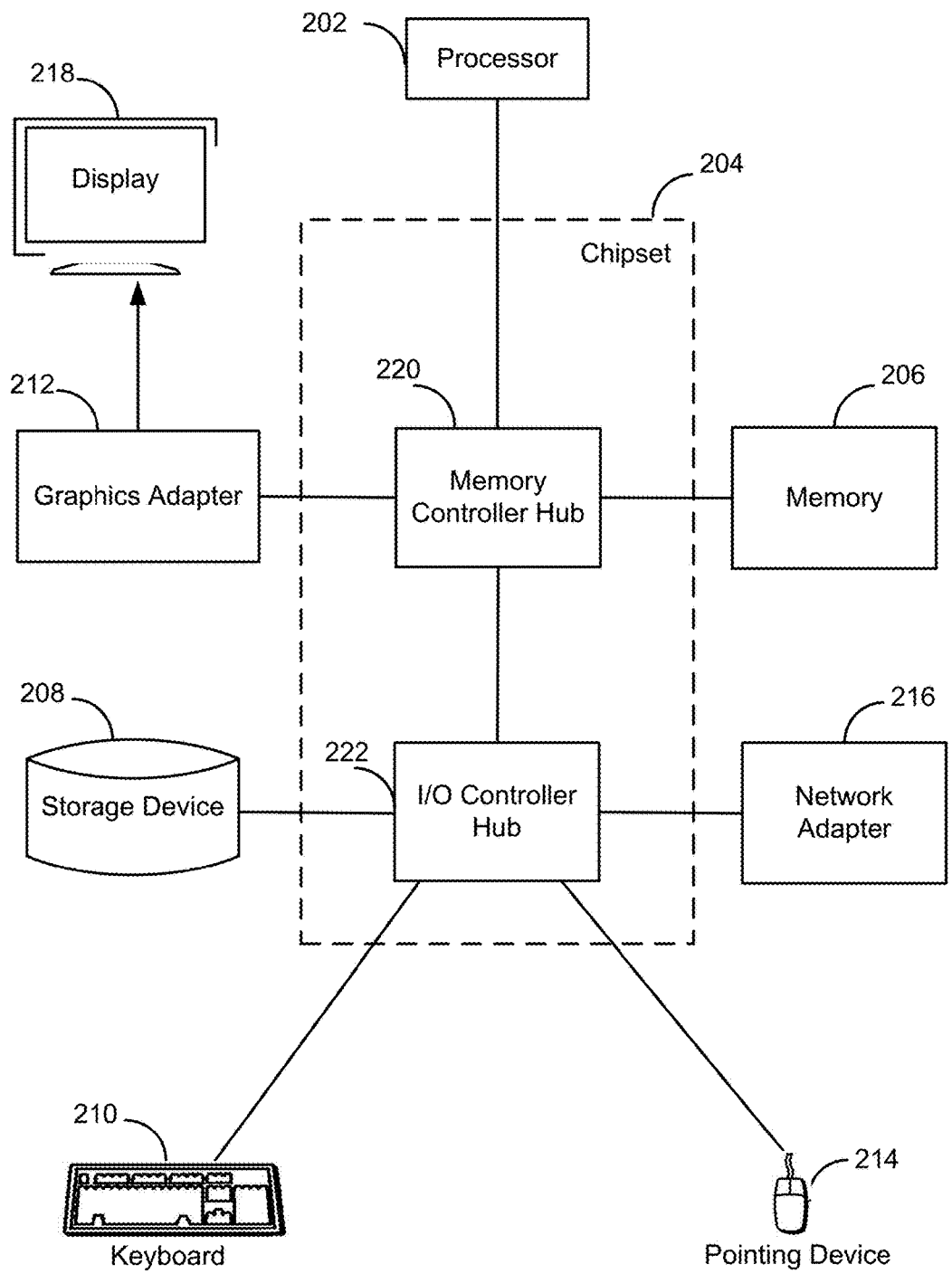
FIG. 2 is a high-level block diagram illustrating an example of a computer for use as the protection system, an enterprise client, and/or a cloud service provider.

FIG. 2 is a high-level block diagram illustrating an example of a computer 200 for use as the protection system 116, an enterprise client, and/or a cloud service provider. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, solid-state memory device, or a magnetic tape drive. The storage device 208 can also include multiple instances of the media, such as an array of hard drives or a magnetic tape changer in communication with a library of magnetic tapes. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer 200 to the network 110. Some embodiments of the computer 200 have different and/or other components than those shown in FIG. 2. For example, a server implementing the protection system 116 or a cloud service 114 can be formed of multiple blade servers and lack a display device, keyboard, and other components.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
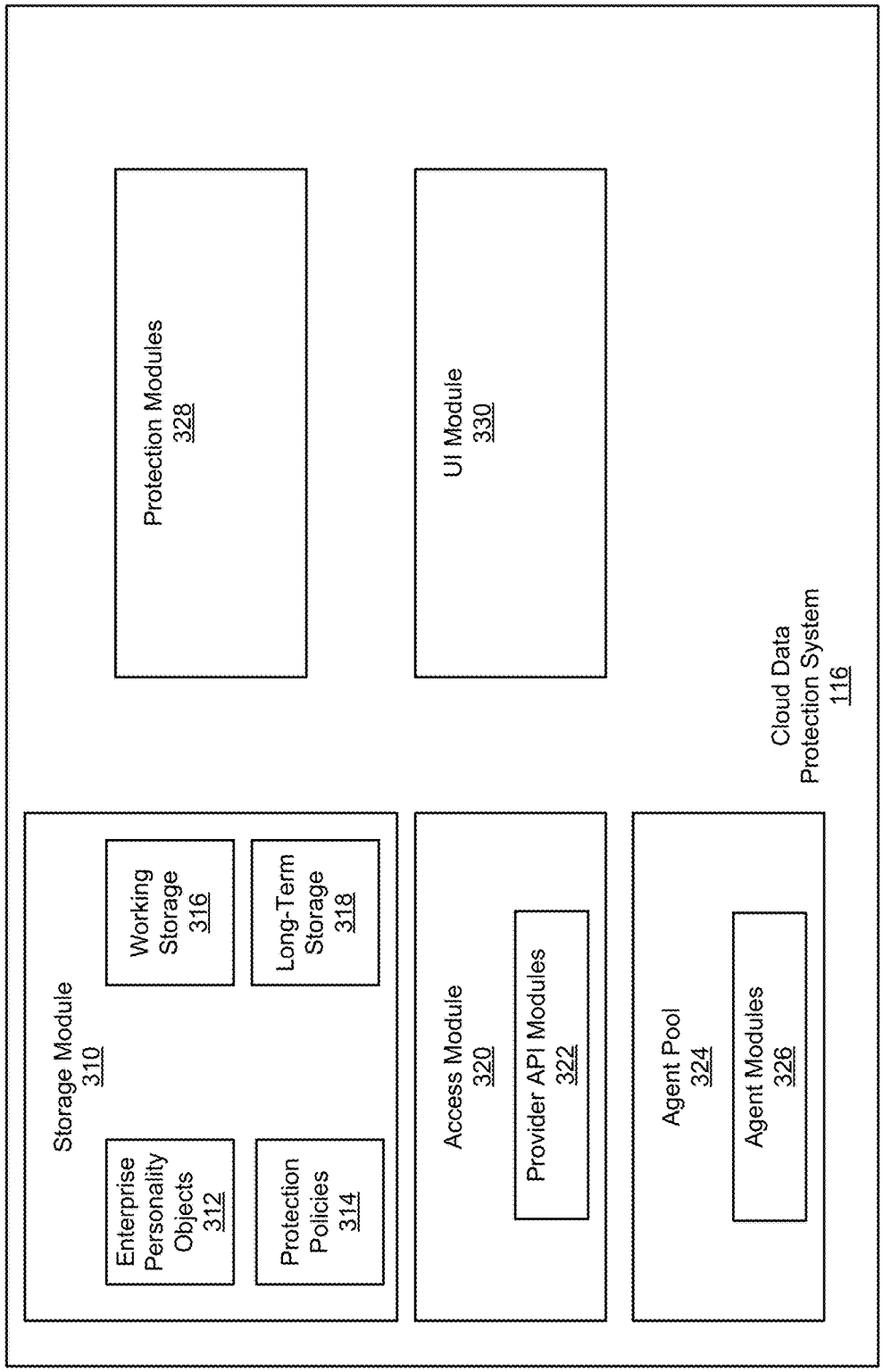
FIG. 3 is a high-level block diagram illustrating a detailed view of the protection system according to one embodiment.

FIG. 3 is a high-level block diagram illustrating a detailed view of the protection system 116 according to one embodiment. As shown in FIG. 3, the protection system 116 includes multiple modules. In some embodiments, the functions are distributed among the modules in a different manner than described herein. In addition, some embodiments include different and/or other modules.

A storage module 310 stores data used by the protection system 116. The stored data can include data used to provide data protection services, as well as the protected data. The storage module 310 can use a variety of techniques to store the data. For example, the storage module 310 can include one or more relational and/or flat file databases. In addition, the data storage module 310 can use remote storage devices on the network 110 to store data. For example, some or all of the data stored by the storage module 310 can be stored using specialized cloud services, such as storage services provided by the SYMANTEC.CLOUD product available from SYMANTEC CORP. of Mountain View, Calif.

In one embodiment, data stored by the storage module 310 include enterprise personality objects 312. The personality objects 312 store information allowing the protection system 116 to access cloud data stored by the cloud services 114. In one embodiment, a personality object 312 stores data associated with a particular enterprise 112. The data stored in the personality object 312 can include identifiers of the cloud services 114 storing cloud data on behalf of the enterprise 112, identifiers of the accounts of enterprise users storing data at the cloud services, and authentication credentials for the identified accounts. The personality object 312 may also store state data associated with the enterprise and/or cloud services 114, such as the date that cloud data were last retrieved from particular cloud services.

The storage module 310 also stores protection policies 314 established by enterprises 112. The enterprise protection policies 314 describe the types of cloud data protection the protection system 116 is to provide to the enterprises, as well as parameters associated with the protections. An enterprise's protection policy 314 can be defined specific to particular data, enterprise users, and cloud services 114. For example, an administrator of an enterprise 112 can establish a protection policy 314 for the enterprise specifying that the protection system 116 backup the enterprise's cloud data, archive certain types of the enterprise's data (e.g., old emails), and perform DLP scanning of other types of data (e.g., customer records). Likewise, the administrator can specify the frequency of the backups, the types of data scanned for during DLP scanning, etc.

A working storage 316 stores cloud data retrieved from the cloud services 114. In one embodiment, the protection policy is applied to cloud data held in the working storage 316. For example, the working storage 316 may store cloud data retrieved from a cloud service 114 while the data are being scanned for compliance with a DLP policy. The working storage 316 may also store data backed up from a cloud service 114 A long-term storage 318, in contrast, stores cloud data that are maintained by the protection system 116 to implement a protection policy, but are infrequently accessed. For example, the long-term storage 318 may include offline storage systems storing archived cloud data.

Turning now to other modules within the protection system 116, an access module 320 serves as the interface between the protection system 116 and the cloud services 114. In one embodiment, the modules within the protection system 116 interact with the cloud services 114 using a common application programming interface (API). Through this API, the modules can perform tasks such as authenticating to the cloud services 114, retrieving cloud data, and submitting cloud data. The access module 320 acts as an abstraction layer between the common API used by the protection system 116 and the different APIs used by the various different cloud services 114. Thus, the access module 320 converts communications using the common API into communications using the API of a specific cloud service 114 and vice versa.

The access module 320 includes a set of provider API modules 322 for converting between the common API and the specific APIs used by the cloud services 114. In one embodiment, each provider API module 322 is associated with a specific cloud service 114, and converts communications between the common API and the API used by the associated cloud service. The provider API modules 322 conform to a "plug-in" architecture. Thus, the functionality of the access module 320 can be extended to cover an additional cloud service 114 by "plugging-in," or adding, a provider API module 322 for that cloud service.

An agent pool 324 includes a set of agent modules 326 for exchanging cloud data between the protection system 116 and the various cloud services 114. In one embodiment, the agent modules 326 are instances of a common agent module, and each includes the same functionality. The multiple agent modules 326 within the agent pool 324 allow the protection system 116 to concurrently support multiple data protection sessions. The agent modules 326 communicate with the cloud services 114 via the access module 320. Thus, the agent modules 326 use the common API, which the provider API modules 322 convert into the specific APIs used by the different cloud services 114.

In one embodiment, the agent modules 326 also implement the enterprise protection policies 314. The application of an enterprise protection policy 314 to the enterprise's cloud data is referred to herein as a "protection session." An agent module 326 examines an enterprise's protection policy 314 to determine the actions to perform in the protection session. For example, the agent module 32 can identify the cloud data to access in order to implement the policy, and the actions to perform on the data according to the policy. The agent module 326 loads the appropriate enterprise personality object 312 or objects that enables the agent module 326 to access the data. Then, the agent module 326 interacts with the appropriate cloud service or services 114 to retrieve the cloud data for the protection session. In one embodiment, the agent module 326 stores the retrieved data in the working storage 316.

For example, assume an enterprise's protection policy 314 specifies that an incremental backup should be performed on CRM data stored on behalf of particular enterprise users at a particular cloud service 114. To implement this policy in a protection session, the agent module 326 identifies the one or more personality objects 312 required to retrieve the data, such as personality objects associated with the enterprise users identified by the protection policy 314. The agent module 326 uses the information in the personality objects 312 to access the cloud service 114 through the access module 320 to retrieve the CRM data created or modified since the last protection session, which it then stores in the working storage 316.

Depending upon the embodiment, the agent modules 326 can activate on demand, on a schedule, and/or according to other activation criteria. For example, the agent pool 324 can be configured to activate an agent module 326 once a day to perform a protection session for a particular enterprise 112. Likewise, the agent module 326 can be activated upon request of an administrator of an enterprise. An agent module 326 can also be activated if an enterprise's protection policy is modified or a new enterprise protection policy 314 is created. Further, in one embodiment one or more additional modules of the protection system 116 provide job scheduling and/or other control functions for the agent modules 326. For example, a service module (not shown) can activate the agent modules 326 according to specified schedules.

As mentioned above, an embodiment of the agent module 326 stores cloud data retrieved from cloud services 114 in the working storage 316. In one embodiment, the agent module 326 retrieves and stores all of the cloud data required for a protection session before performing the protection actions. This technique makes efficient use of bandwidth and other computational resources by retrieving the cloud data only once per protection session.

Further, in one embodiment the agent modules 326 interact with the cloud services 114 to implement the results of protection actions performed during a protection session. These interactions can include restoring and/or remediating cloud data by submitting cloud data to a cloud service 114, causing a cloud service to delete or modify cloud data, and/or performing other actions. For example, if the DLP scanning of cloud data in the working storage 316 identifies data objects within the cloud data that should not be present, an agent module 326 can interact with the cloud service 114 from which the data were retrieved to remove the data objects from the cloud data held by the cloud service.

The protection system 116 also includes a set of protection modules 328 for performing protection actions on the retrieved cloud data stored in the working storage 316. The protection modules 328 are activated by the agent module 326 as described above. In one embodiment, the protection modules 328 conform to a plug-in architecture, similar to the provider API modules 322. Each protection module 328 performs a specified, different protection action on the cloud data, such as backup, archiving, or DLP scanning. The protection modules 328 are described in more detail with respect to FIG. 4.

An embodiment of the protection system 116 also includes a user interface (UI) module 330 providing a UI for controlling and viewing status information about the protection system 116. In one embodiment, the UI module 330 includes a web server that provides a web-based UI accessible to clients via the network 110. Administrators of the enterprises 112 access the UI to perform tasks such as providing information for personality objects 312, establishing protection policies 314, configuring the protection modules 328, selecting data for remediation or restoration, etc. Similarly, an administrator of the protection system 116 uses the UI to perform tasks such as installing and configuring the provider API modules 322 and the protection modules 328. Thus, the protection system 116 uses the UI module 330 to receive information from the administrators. The administrators also access the UI to view reports describing actions performed by the protection system 116.

Figure 4:
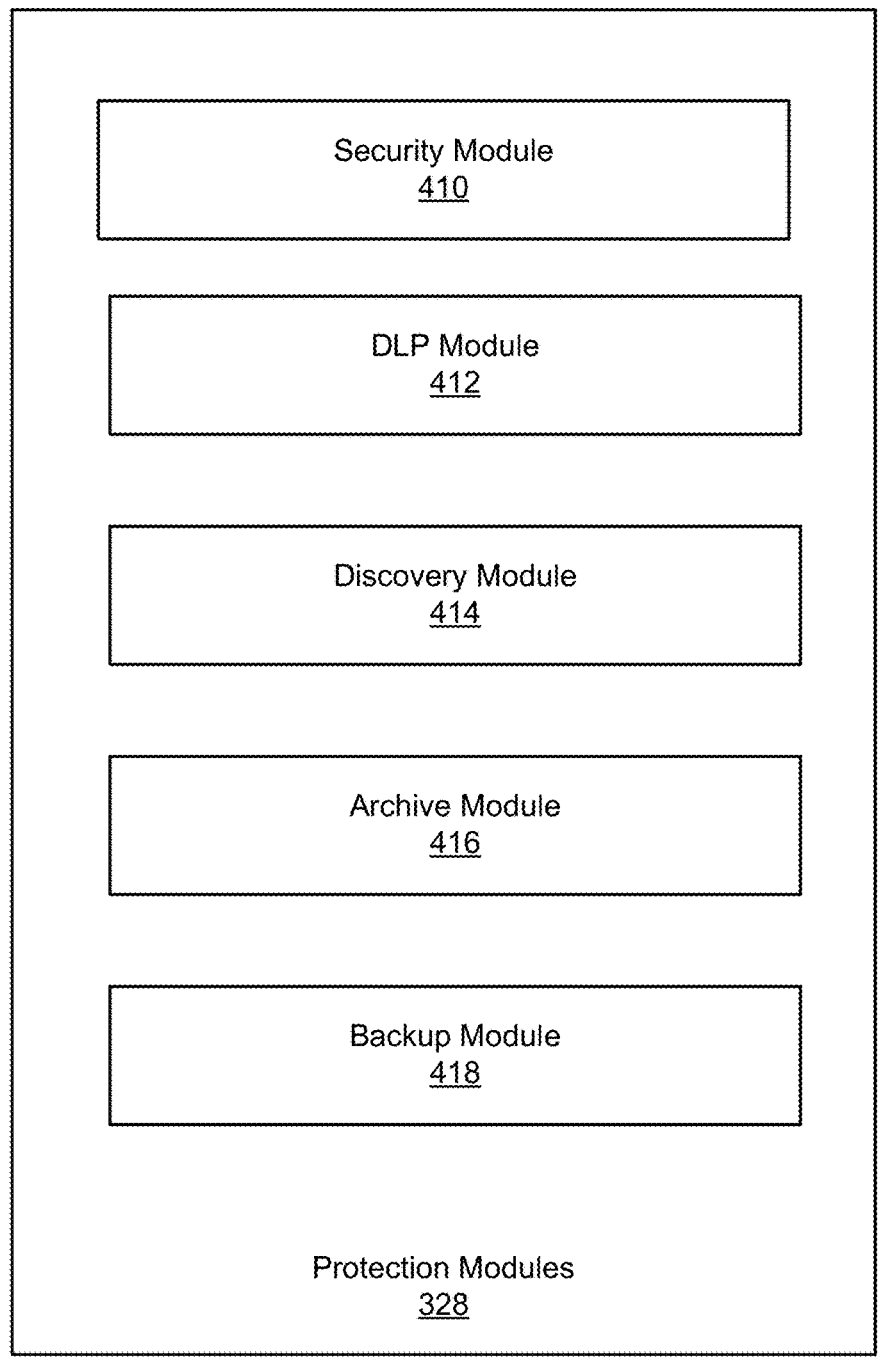
FIG. 4 is a high-level block diagram illustrating a detailed view of the protection modules according to one embodiment.

FIG. 4 is a high-level block diagram illustrating a detailed view of the protection modules 328 according to one embodiment. As shown in FIG. 4, there are multiple protection modules 328. In some embodiments, the functions are distributed among the modules in a different manner than described herein. In addition, some embodiments include different and/or other modules. As mentioned above, in one embodiment the protection modules 328 operate on cloud data retrieved from one or more cloud services 114 and stored in the working storage 316. In other embodiments the protection modules 328 operate on cloud data stored at the cloud services 114 and/or on cloud data stored in long-term storage 318.

A security module 410 scans cloud data for malicious software (malware) and/or other security threats. Depending on the embodiment, the security module 410 may use a variety of techniques to scan for malware. For example, the security module 410 may maintain or access a set of malware definitions that describe string patterns or other data indicating the presence of malware, and the security module 410 can scan the cloud data to detect any data that matches the malware definitions. The security module 410 may also maintain or access a set of behavioral definitions that describe actions performed by malware when executed. The security module 410 may execute executable content in the cloud data (e.g., in a virtual machine) and detect any actions that match the malware definitions.

If the security module 410 detects malware in the cloud data, it may perform a remediation action such as removing the malware from the cloud data and/or reporting the malware detection to an administrator of the enterprise 112 associated with the cloud data. In one embodiment, the security module 410 remediates the malware by interacting with an agent module 326 to remove the malware-infected data from the cloud data stored by the cloud service 114.

A DLP module 412 scans cloud data for compliance with a DLP policy. In one embodiment, the policy is established by an administrator of the enterprise 112 associated with the cloud data. The policy specifies types of data that should not be present in the cloud data, such as personally identifiable information like credit card and social security numbers, medical records, and trade secret or other confidential information. The DLP module 412 scans the cloud data to detect data objects having characteristics associated with the specified data types, such as data objects in a file format of a medical record or text strings consistent with credit card numbers. If the DLP module 412 detects data objects not in compliance with the DLP policy, the DLP module may perform a remediation action such as removing the non-compliant objects from the cloud data stored by the associated cloud service 114 and/or reporting the non-compliant data to an administrator.

A discovery module 414 provides electronic discovery (e-discovery) support by scanning cloud data for data objects matching a discovery specification. E-discovery refers to identifying data objects required for production in civil litigation or for similar purposes. An administrator of the enterprise 112 and/or another person associated with the e-discovery process provides a discovery specification describing characteristics of data objects to be discovered. The discovery module 414 analyzes the cloud data to identify data objects matching the discovery specification. The discovery module 414 generates a report describing the identified data object, extracts the data objects for production, and/or performs other actions supporting the e-discovery process.

An archive module 416 archives cloud data to an archive storage according to an archive policy. The archive policy may be established by an administrator of the enterprise 112 associated with the cloud data. Enterprises 112 often must retain certain types of cloud data, such as old email messages, even though the data are rarely accessed. The archive policy specifies the characteristics of data to archive, and the archive module 416 stores such data to archive storage. In addition, an embodiment of the archive module 416 removes the archived data from the cloud service 114, so that the archived data are stored only in the archive storage. The archive module 416 can also restore archived data from the archive storage to the cloud service from which it was originally archived (or to another location). The archive storage may be within the long-term storage 318.

A backup module 418 backs up cloud data according to a backup policy. As with the archive policy, the backup policy may be established by an administrator of the enterprise 112 associated with the cloud data. The backup policy specifies the characteristics of the data to back up, and the backup module 418 backs up (i.e., stores a copy of) the cloud data to a backup storage. For example, the backup policy can specify the cloud services 114 from which to backup data and the data objects at the cloud services to backup. In addition, the backup module 418 may support incremental backup where only changes since a previous backup are stored. Likewise, the backup module 418 may support versioning capabilities where multiple versions of data objects are stored. In one embodiment, the backed-up cloud data also remains at the cloud service 114, so that the data in the backup storage serves as a duplicate copy of the data. The backup module 418 can restore the backed-up data to the cloud services 114 if necessary or desired. The backup storage may be within the working storage 316 and/or within the long-term storage 318.

In one embodiment, the agent module 326 activates the backup module 418 prior to activating the other protection modules 328. The backup module 418 backs up the cloud data to the backup storage according to the backup policy. Then, the other protection modules 328 activated according the protection policy 314 operate on the backed-up data. For example, the security module 410 may scan the data in the backup storage for compliance with the security policy. Likewise, the discovery module 414 may scan cloud data objects in the backup storage for data matching the discovery specification.

Figure 5:
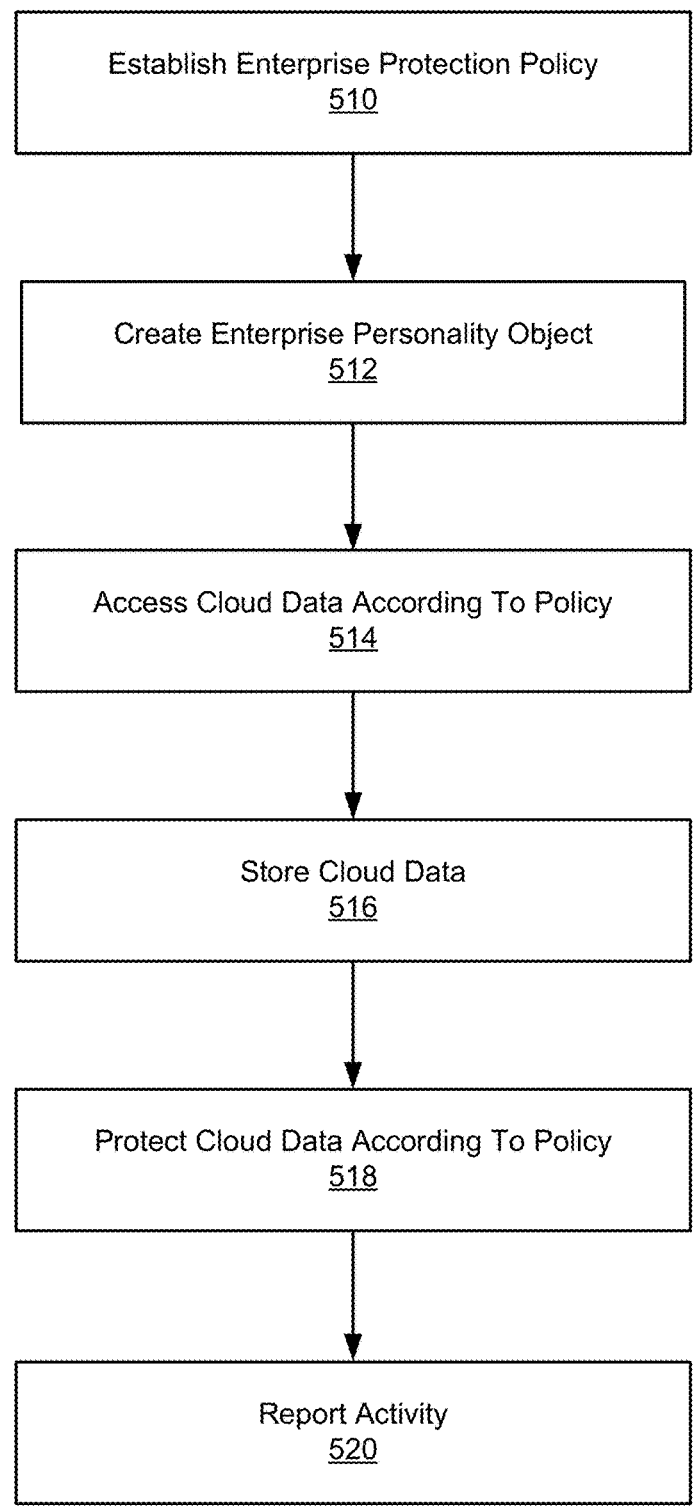
FIG. 5 is a flowchart illustrating a method of protecting an enterprise's cloud data according to one embodiment.

FIG. 5 is a flowchart illustrating a method of protecting an enterprise's cloud data according to one embodiment. Other embodiments can perform the steps in different orders and can include different and/or additional steps. The steps can be performed concurrently to provide simultaneous protection of cloud data associated with multiple enterprises. In addition, some or all of the steps can be performed by entities other than the protection system 116.

A protection policy 314 for the enterprise is established 510. In one embodiment, an administrator of the enterprise 112 interacts with the protection system 116 using the UI to establish the enterprise protection policy 314. To this end, the administrator identifies the cloud services 114 that store cloud data on behalf of the enterprise 112, the cloud data objects to which the protection policy applies, and the policies/specifications of the various protection modules 328 to be included within the policy. For example, the administrator can establish a protection policy that backs up CRM data held by a specific cloud service 114 according to a specified backup schedule. In addition, one or more enterprise personality objects 312 are created 512. For example, the administrator can create personality objects 312 by providing authentication credentials for accounts at cloud services 114 that store the protected cloud data. Thus, the protection system 116 receives the protection policy 314 and the personality objects 312 through interactions with the administrator.

The protection system 116 accesses 514 the cloud data according to the enterprise protection policy. In one embodiment, an agent module 326 in the agent pool 324 activates as part of a protection session, accesses the enterprise protection policy 314, and uses the appropriate enterprise personality objects 312 to retrieve the appropriate cloud data from the cloud services 114. The agent module 326 stores 516 the cloud data in the working storage 316 of the protection system 116. The protection system 116 protects 518 the cloud data in the working storage 316 by applying the protection modules 328 according to the enterprise protection policy 314 and the policies/specifications of the individual protection modules. In one embodiment, the protection system 116 applies the protection modules 328 in a specific sequence determined according to the enterprise protection policy 314. For example, the protection system 116 can back up the cloud data to a backup storage, and then perform DLP scanning and/or other protection actions on the backed-up data. The protection system 116 reports 520 the results of the protection session to the enterprise administrator and/or to another entity.

Figure 6:
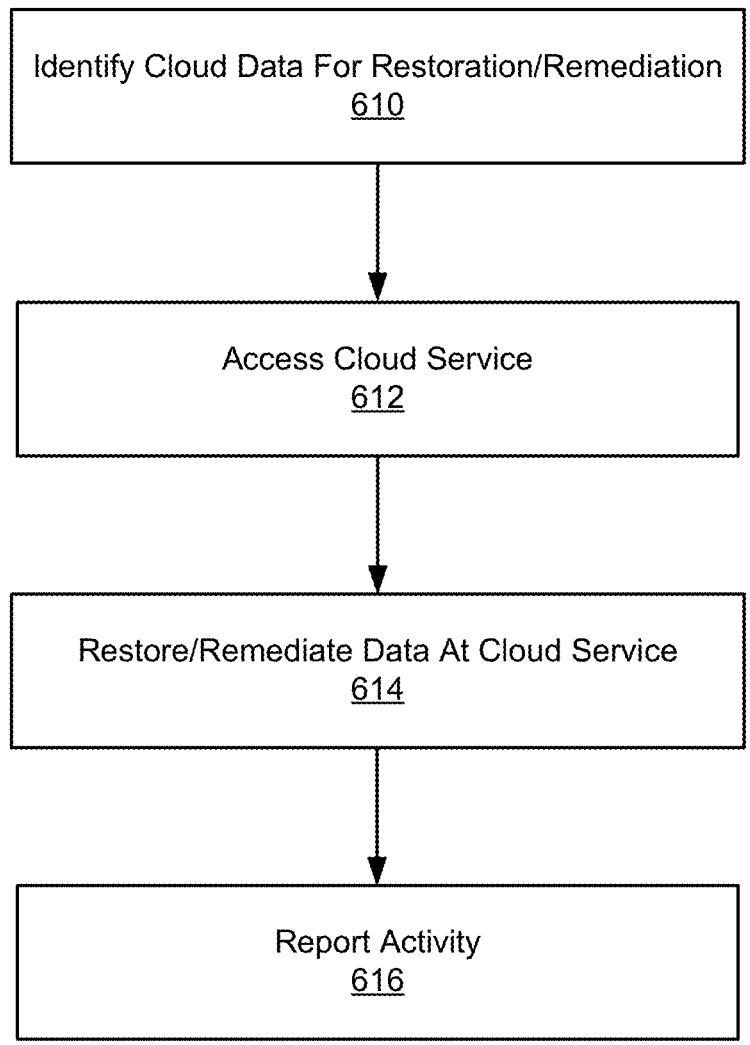
FIG. 6 is a flowchart illustrating a method of restoring and/or remediating cloud data protected by the protection system according to one embodiment.

FIG. 6 is a flowchart illustrating a method of restoring and/or remediating cloud data protected by the protection system 116 according to one embodiment. Other embodiments can perform the steps in different orders and can include different and/or additional steps. The steps can be performed concurrently to provide simultaneous restoration/remediation of cloud data associated with multiple enterprises 112. In addition, some or all of the steps can be performed by entities other than the protection system 116.

The protection system 116 identifies 610 protected cloud data for restoration or remediation. For example, the administrator of an enterprise 112 may interact with the protection system 116 and request that archived or backed up cloud data be restored to the cloud service 114 or services from which the data were originally retrieved. In another example, the DLP module 412 may detect data objects that are not compliant with a DLP policy during a protection session, and produce remediated data that are compliant.

The protection system 116 accesses the cloud service 114 from which the cloud data were originally retrieved. In one embodiment, an agent module 326 uses the appropriate enterprise personality object 312 to interface with the cloud service 114. The protection system 116 submits 614 the data to the cloud service 114 or otherwise configures the data held by the cloud service to restore and/or remediate the data. The protection system 116 also reports 616 the restoration/remediation actions to the enterprise administrator and/or to another entity.

In sum, the protection system 116 protects data stored by cloud services 114 on behalf of enterprises 112. The protection system 116 provides multiple different types of protection, and allows the enterprises to establish the policies describing the specific protections to provide to the enterprises' data. Moreover, the protection system 116 efficiently interacts with the cloud services 114 by retrieving the cloud data and storing the data in working storage 316, and then performing the protection actions on the stored data.

Thus, multiple types of cloud data protection are provided even though the cloud data are retrieved only once per session.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of protecting cloud data of enterprises, comprising:
   receiving, by a cloud protection system, a first protection policy for a first enterprise, the first protection policy describing first cloud data protection actions to perform on cloud data of the first enterprise and a first sequence in which to perform the first cloud data protection actions on the cloud data of the first enterprise;
   receiving, by the cloud protection system, a second protection policy for a second enterprise, the second protection policy describing second cloud data protection actions to perform on cloud data of the second enterprise and a second sequence in which to perform the second cloud data protection actions on the cloud data of the second enterprise, the second sequence distinct from the first sequence of first cloud data protection actions described by the first protection policy, and the second protection policy defined specific to the second enterprise;
   accessing, by the cloud protection system, the cloud data of the first enterprise and the cloud data of the second enterprise stored by one or more remote cloud services that are distinct from the cloud protection system;
   storing, by the cloud protection system, the accessed cloud data of the first enterprise and the accessed cloud data of the second enterprise at a working storage within the cloud protection system; and
   respectively performing, by the cloud protection system, the first cloud data protection actions and the second cloud data protection actions on the accessed cloud data of the first enterprise and the accessed cloud data of the second enterprise that are stored in the working storage within the cloud protection system, each of the first cloud data protection actions performed on the accessed cloud data of the first enterprise according to the first sequence described in the first protection policy and each of the second cloud data protection actions performed on the accessed cloud data of the second enterprise according to the second sequence described in the second protection policy that is distinct from the first sequence.

2. The method of claim 1, wherein receiving the first protection policy for the first enterprise comprises:
   establishing, by the cloud protection system, the first protection policy for the first enterprise, the first protection policy specifying a plurality of types of cloud data protection to provide to cloud data of the first enterprise, the one or more remote cloud services that store the cloud data, and parameters associated with the plurality of types of cloud data protection.

3. The method of claim 1, further comprising:
   loading, by the cloud protection system, both a first personality object and a second personality object, the first personality object enabling access to the cloud data of the first enterprise from the one or more remote cloud services and the second personality object enabling access to the cloud data of the second enterprise from the one or more remote cloud services.

4. The method of claim 3, wherein the first personality object and the second personality object each store authentication credentials for the one or more remote cloud services that store the cloud data of the first enterprise and the cloud data of the second enterprise.

5. The method of claim 1, wherein accessing the cloud data comprises:
   examining, by the cloud protection system, the first protection policy to identify the cloud data of the first enterprise and stored by a first remote cloud service to access in order to implement the first protection policy;
   examining, by the cloud protection system, the second protection policy to identify the cloud data of the second enterprise and stored by a second remote cloud service to access in order to implement the second protection policy;
   interacting with the first cloud service and the second cloud service to respectively retrieve the cloud data of the first enterprise and the cloud data of the second enterprise.

6. The method of claim 5, wherein performing the first cloud data protection actions and the second cloud data protection actions comprises:
   applying, by the cloud protection system, each of the first cloud data protection actions to the retrieved cloud data of the first enterprise and each of the second cloud data protection actions to the retrieved cloud data of the second enterprise stored in the working storage according to the first sequence and the second sequence respectively, each protection action performing a different protection action on the retrieved cloud data of the first enterprise and the retrieved cloud data of the second enterprise.

7. The method of claim 6, wherein all of the cloud data of the first enterprise and the cloud data of the second enterprise are stored in the working storage prior to applying the first protection actions and the second protection actions to the cloud data stored in the working storage.

8. The method of claim 6, wherein the first cloud protection actions and the second cloud protection actions comprise two or more protection actions from the set consisting of:
   scanning, by the cloud protection system, the cloud data of the first enterprise and the cloud data of the second enterprise stored in the working storage for malicious software;
   scanning, by the cloud protection system, the cloud data of the first enterprise and the cloud data of the second enterprise stored in the working storage for compliance with a data loss prevention policy;
   scanning, by the cloud protection system, the cloud data of the first enterprise and the cloud data of the second enterprise stored in the working storage for data objects matching an electronic discovery specification;
   archiving, by the cloud protection system, at least some of the cloud data of the first enterprise and the cloud data of the second enterprise stored in the working storage to an archive storage according to an archive policy; and
   backing up at least some of the cloud data of the first enterprise and the cloud data of the second enterprise stored in the working storage to a backup storage according to a backup policy.

9. The method of claim 6, wherein applying each of the first cloud data protection actions to the retrieved cloud data of the first enterprise and each of the second cloud data protection actions comprises:
    backing up at least some of the cloud data of the first enterprise and the cloud data of the second enterprise stored in the working storage to a backup storage according to a backup policy; and
    scanning, by the cloud protection system, the cloud data of the first enterprise and the cloud data of the second enterprise stored in the working storage for compliance with a data loss prevention policy.

10. The method of claim 1, further comprising:
    identifying, by the cloud protection system, cloud data of the first enterprise and the cloud data of the second enterprise stored by a remote cloud data service needing remediation responsive to applying the one or more protection actions to the retrieved cloud data of the first enterprise and the cloud data of the second enterprise;
    accessing, by the cloud protection system, the cloud data service from which the cloud data of the first enterprise and the cloud data of the second enterprise needing remediation were retrieved; and
    configuring, by the cloud protection system, the cloud data of the first enterprise and the cloud data of the second enterprise held by the cloud data service to remediate the cloud data needing remediation.

11. The method of claim 1, wherein performing the first cloud data protection actions and the second cloud data protection actions on the accessed cloud data of the first enterprise and the accessed cloud data of the second enterprise comprises:
    applying each of the first cloud data protection actions to the accessed cloud data of the first enterprise according to the first sequence and applying each of the second cloud data protection actions to the accessed cloud data of the second enterprise according to the second sequence.

12. A non-transitory computer-readable storage medium storing executable computer program instructions for protecting cloud data of enterprises, the instructions that, when executed by at least on computer processor, cause the computer processor to perform steps comprising:
    receiving, by a cloud protection system, a first protection policy for a first enterprise, the first protection policy describing first cloud data protection actions to perform on cloud data of the first enterprise and a first sequence in which to perform the first cloud data protection actions on the cloud data of the first enterprise;
    receiving, by the cloud protection system, a second protection policy for a second enterprise, the second protection policy describing second cloud data protection actions to perform on cloud data of the second enterprise and a second sequence in which to perform the second cloud data protection actions on the cloud data of the second enterprise, the second sequence distinct from the first sequence of first cloud data protection actions described by the first protection policy, and the second protection policy defined specific to the second enterprise;
    accessing, by the cloud protection system, the cloud data of the first enterprise and the cloud data of the second enterprise stored by one or more remote cloud services that are distinct from the cloud protection system;
    storing, by the cloud protection system, the accessed cloud data of the first enterprise and the accessed cloud data of the second enterprise at a working storage within the cloud protection system;
    respectively performing, by the cloud protection system, the first cloud data protection actions and the second cloud data protection actions on the accessed cloud data of the first enterprise and the accessed cloud data of the second enterprise that are stored in the working storage within the cloud protection system, each of the first cloud data protection actions performed on the accessed cloud data of the first enterprise according to the first sequence described in the first protection policy and each of the second cloud data protection actions performed on the accessed cloud data of the second enterprise according to the second sequence described in the second protection policy that is distinct from the first sequence.

13. The computer-readable medium of claim 12, wherein accessing the cloud data comprises:
    examining, by the cloud protection system, the first protection policy to identify the cloud data of the first enterprise and stored by a first remote cloud service to access in order to implement the first protection policy;
    examining, by the cloud protection system, the second protection policy to identify the cloud data of the second enterprise and stored by a second remote cloud service to access in order to implement the second protection policy;
    interacting, by the cloud protection system, with the first cloud service and the second cloud service to respectively retrieve the cloud data of the first enterprise and the cloud data of the second enterprise.

14. The computer-readable medium of claim 13, wherein performing the first cloud data protection actions and the second cloud data protection actions comprises:
    applying, by the cloud protection system, each of the first cloud data protection actions to the retrieved cloud data of the first enterprise and each of the second cloud data protection actions to the retrieved cloud data of the second enterprise stored in the working storage according to the first sequence and the second sequence respectively, each protection action performing a different protection action on the retrieved cloud data of the first enterprise and the retrieved cloud data of the second enterprise.

15. The computer-readable medium of claim 14, wherein all of the cloud data of the first enterprise and the cloud data of the second enterprise are stored in the working storage prior to applying the first protection actions and the second protection actions to the cloud data stored in the working storage.

16. The computer-readable medium of claim 14, wherein applying the first cloud data protection actions to the retrieved cloud data of the first enterprise and the second cloud data protection actions comprises:
    backing up at least some of the cloud data of the first enterprise and the cloud data of the second enterprise stored in the working storage to a backup storage according to a backup policy; and
    scanning, by the cloud protection system, the cloud data of the first enterprise and the cloud data of the second enterprise stored in the working storage for compliance with a data loss prevention policy.

17. A cloud protection system for protecting cloud data of an enterprise, the cloud protection system comprising:
    at least one computer processor;
    a non-transitory computer-readable storage medium storing executable computer program instructions that, when executed by the computer processor, cause the computer processor to perform steps comprising:

receiving, by the cloud protection system, a first protection policy for a first enterprise, the first protection policy describing first cloud data protection actions to perform on cloud data of the first enterprise and a first sequence in which to perform the first cloud data protection actions on the cloud data of the first enterprise;

receiving, by the cloud protection system, a second protection policy for a second enterprise, the second protection policy describing second cloud data protection actions to perform on cloud data of the second enterprise and a second sequence in which to perform the second cloud data protection actions on the cloud data of the second enterprise, the second sequence distinct from the first sequence of first cloud data protection actions described by the first protection policy, and the second protection policy defined specific to the second enterprise;

accessing, by the cloud protection system, the cloud data of the first enterprise and the cloud data of the second enterprise stored by one or more remote cloud services;

storing, by the cloud protection system, the accessed cloud data of the first enterprise and the accessed cloud data of the second enterprise at a working storage within the cloud protection system; and respectively performing, by the cloud protection system, the first cloud data protection actions and the second cloud data protection actions on the accessed cloud data of the first enterprise and the accessed cloud data of the second enterprise that are stored in the working storage within the cloud protection system, the first cloud data protection actions performed on the accessed cloud data of the first enterprise according to the first sequence described in the first protection policy and each of the second cloud data protection actions performed according to the second sequence described in the second protection policy that is distinct from the first sequence.

18. The cloud protection system of claim 17, wherein accessing the cloud data comprises:

examining, by the cloud protection system, the first protection policy to identify the cloud data of the first enterprise and stored by a first remote cloud service to access in order to implement the first protection policy;

examining, by the cloud protection system, the second protection policy to identify the cloud data of the second enterprise and stored by a second remote cloud service to access in order to implement the second protection policy;

interacting with the first cloud service and the second cloud service to respectively retrieve the cloud data of the first enterprise and the cloud data of the second enterprise.

19. The cloud protection system of claim 18, wherein performing the first cloud data protection actions and the second cloud data protection actions comprises:

applying, by the cloud protection system, each of the first cloud data protection actions to the retrieved cloud data of the first enterprise and each of the second cloud data protection actions to the retrieved cloud data of the second enterprise stored in the working storage according to the first sequence and the second sequence respectively, each protection action performing a different protection action on the retrieved cloud data of the first enterprise and the retrieved cloud data of the second enterprise.

20. The cloud protection system of claim 19, wherein all of the cloud data of the first enterprise and the cloud data of the second enterprise are stored in the working storage prior to applying the first protection actions and the second protection actions to the cloud data stored in the working storage.

21. The cloud protection system of claim 19, wherein applying each of the first cloud data protection actions to the retrieved cloud data of the first enterprise and each of the second cloud data protection actions comprises:

backing up at least some of the cloud data of the first enterprise and the cloud data of the second enterprise stored in the working storage to a backup storage according to a backup policy; and scanning, by the cloud protection system, the cloud data of the first enterprise and the cloud data of the second enterprise stored in the working storage for compliance with a data loss prevention policy.

* * * * *